(12) United States Patent
Price et al.

(10) Patent No.: US 6,283,759 B1
(45) Date of Patent: Sep. 4, 2001

(54) SYSTEM FOR DEMONSTRATING COMPLIANCE WITH STANDARDS

(75) Inventors: James R. Price, Naperville; Karl W. Fronczke, Downers Grove, both of IL (US)

(73) Assignee: R. J. Price, Naperville, IL (US)

( * ) Notice: Subject to any disclaimer, the term of this patent is extended or adjusted under 35 U.S.C. 154(b) by 0 days.

(21) Appl. No.: 09/191,692

(22) Filed: Nov. 13, 1998

(51) Int. Cl.[7] .................................................. G09B 29/00
(52) U.S. Cl. .................................. 434/72; 703/1; 706/921
(58) Field of Search ........................... 434/72; 703/1; 706/921

(56) References Cited

U.S. PATENT DOCUMENTS

| | | | |
|---|---|---|---|
| 4,964,060 | * 10/1990 | Hartsog | 703/1 |
| 5,227,983 | * 7/1993 | Cox et al. | 703/1 X |
| 5,311,443 | * 5/1994 | Crain et al. | 716/10 X |
| 5,557,537 | * 9/1996 | Normann et al. | 703/1 X |
| 6,131,077 | * 10/2000 | Normann et al. | |

* cited by examiner

Primary Examiner—Valencia Martin-Wallace
Assistant Examiner—Chanda Harris
(74) Attorney, Agent, or Firm—Marshall, O'Toole, Gerstein, Murray & Borun (57) ABSTRACT

Compliance with a standard is demonstrated by displaying a floor plan on a first computer. The displayed floor plan includes designated areas. Each designated area includes a corresponding communication link, and the designated areas are regulated by the standard. A message is transmitted to a second computer in response to selection of one of the designated areas by a user on the first computer. The message is dependent upon the communication link corresponding to the selected designated area and causes compliance information to be downloaded by the second computer to the first computer. The compliance information is displayed on the first computer and demonstrates that the selected designated area is in compliance with the standard.

42 Claims, 13 Drawing Sheets

St. Joseph's Hospital CAD Online

| 7th Floor: Cluster 4 | | |
|---|---|---|
| Location | Description | |
| Lobby Side Between Fire Doors & Charting Room | No Description | Goto Pictures |

| Firestop Systems Used | |
|---|---|
| Quantity Used | U.L. System Number |
| 3 | CAJ-1149 | Goto Plate |
| 1 | CAJ-0055 | Goto Plate |
| 1 | CAJ-8041 | Goto Plate |
| 1 | CAJ-5091 | Goto Plate |

St. Joseph's Hospital CAD Online 50

| 7th Floor: Cluster 3 | |
|---|---|
| Location | Description |
| Lobby Side Above Fire Doors Between Charting Room 754 & Elevator | No Description  Goto Pictures |

| Firestop Systems Used | | |
|---|---|---|
| Quantity Used | U.L. System Number | |
| 1 | CAJ-8041 | Goto Plate |
| 1 | CAJ-0055 | Goto Plate |
| 4 | WJ-8004 | Goto Plate |
| 7 | CAJ-1149 | Goto Plate |

SYSTEM FOR DEMONSTRATING COMPLIANCE WITH STANDARDS

TECHNICAL FIELD OF THE INVENTION

The present invention relates to a system which assists an organization in demonstrating compliance with standards.

BACKGROUND OF THE INVENTION

Insurance companies and/or governments require certain buildings, such as hospitals, schools, businesses, and the like, to comply with a variety of standards. These standards may be in the form of industry standards, local codes, federal regulations, state regulations, local regulations, and/or the like, and may regulate, for example, protection against the hazards of fire, smoke, asbestos, and/or the like. In order to assure compliance with applicable standards, inspectors periodically conduct inspections of the buildings covered by such standards. During such inspections, it is incumbent upon building administrators to demonstrate compliance with these standards.

Demonstrating such compliance is often tedious and expensive. For example, pipes running through walls of a building must be sealed with a material acting as a firestop in order to comply with firestop standards. However, these firestops may be between walls, in elevator shafts, and in other places that are often inaccessible or not easily accessible to inspectors. Therefore, it may be necessary to destroy portions of inspected buildings in order to demonstrate compliance with applicable standards.

The present invention permits the administrator of a building to demonstrate compliance to an inspector without destructive testing.

SUMMARY OF THE INVENTION

In accordance with one aspect of the present invention, a method executed on a computer comprises the following steps: a) displaying a floor plan selected by a user, wherein the displayed floor plan is regulated by a standard; and, b) displaying information demonstrating that the floor plan is in compliance with the standard.

In accordance with another aspect of the present invention, a method executed on a computer comprises the following steps: a) displaying a floor plan selected by a user, wherein the displayed floor plan includes designated areas, and wherein the designated areas are regulated by a standard; and, b) in response to selection by the user of one of the designated areas, displaying information demonstrating that the selected designated area is in compliance with the standard.

In accordance with still another aspect of the present invention, a method for demonstrating compliance with a standard comprises the following steps which are executed on a first computer: a) displaying a floor plan on the first computer, wherein the displayed floor plan is selected by a user, wherein the displayed floor plan includes designated areas, wherein each designated area includes a corresponding communication link, and wherein the designated areas are governed by a standard; b) transmitting a message to a second computer in response to selection of one of the designated areas by the user on the first computer, wherein the message is dependent upon the communication link corresponding to the selected designated area; c) receiving information from the second computer, wherein the information demonstrates that the selected designated area is in compliance with the standard; and, d) displaying the information on the first computer.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
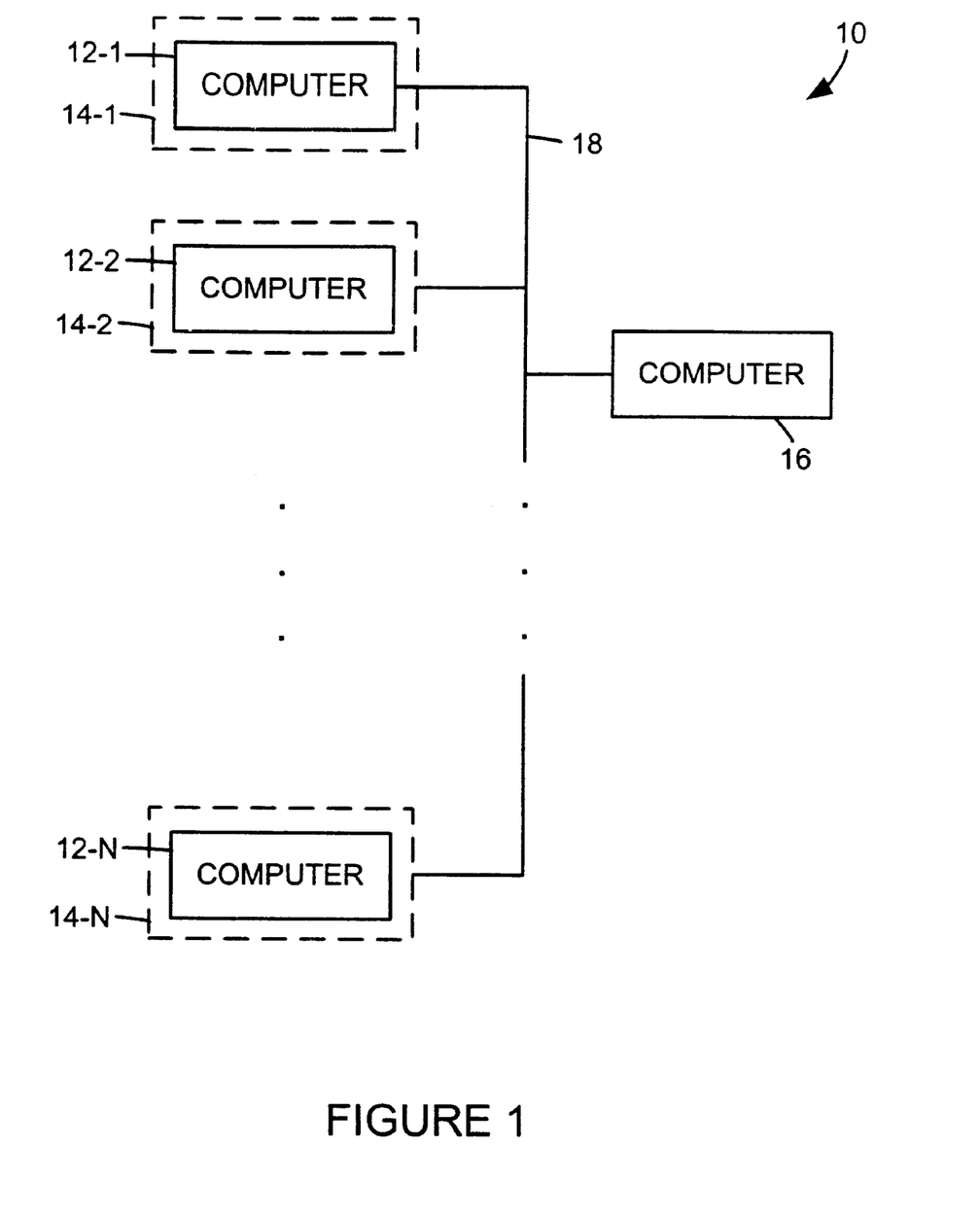
FIG. 1 shows a computer system according to the present invention.

The present invention may be implemented by a computer system 10 as shown in FIG. 1. The computer system 10 includes a plurality of computers 12 including a computer 12-1, a computer 12-2, . . ., and a computer 12-N. The computer 12-1 is located within a corresponding building 14-1, the computer 12-2 is located within a corresponding building 14-2, . . ., and the computer 12-N is located within a corresponding building 14-N. The computers 12 communicate with a central computer 16 over a network 18. The network 18, for example, may be a public telephone system, the Internet, or the like.

When an inspector wishes to inspect the building 14-1, for example, an administrator for the building 14-1 may access and display the floor plans of the building 14-1 by use of the computer 12-1. These floor plans show each floor of the building 14-1 and include cluster areas which may be selected by the administrator in order to demonstrate compliance with the standards enforced by the inspector.

Figure 2:
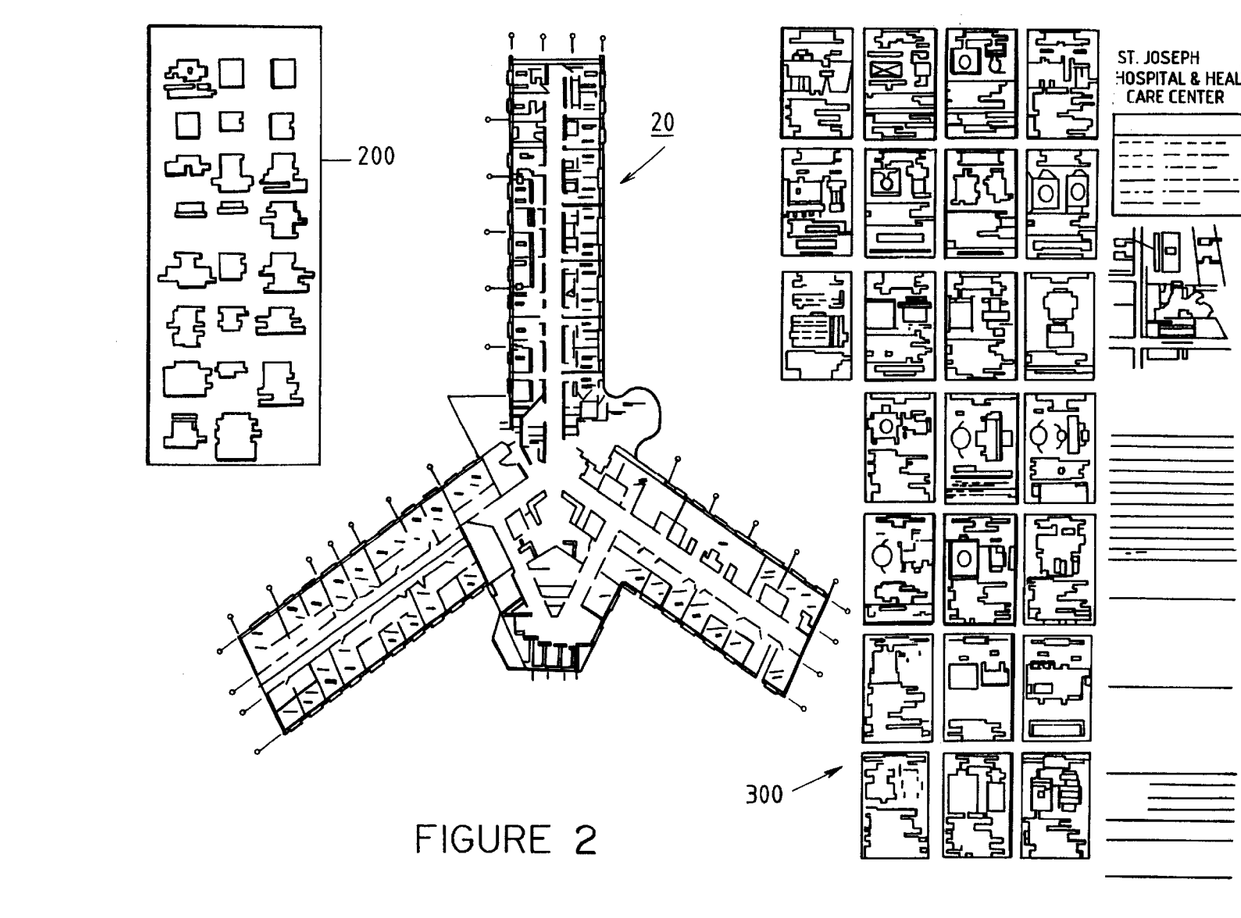
FIG. 2 shows a floor plan which may be displayed on at least one of the computers of FIG. 1.

One such floor plan 20 is illustrated in FIG. 2. The floor plan 20 shows a plan of a corresponding floor of the building 14-1. A suitable tool, such as a zoom tool that is common with many programs executed on computers, is provided by the computer 12-1 in order to enable the administrator to enlarge any portion of the floor plan 20. Thus, although the detail of the floor plan 20 is difficult to read with respect to FIG. 2, any portion of the floor plan 20 may be enlarged in order to more adequately display the information contained therein. Such an enlargement of a portion 22 of the floor plan 20 is shown in FIG. 3.

Figure 3:
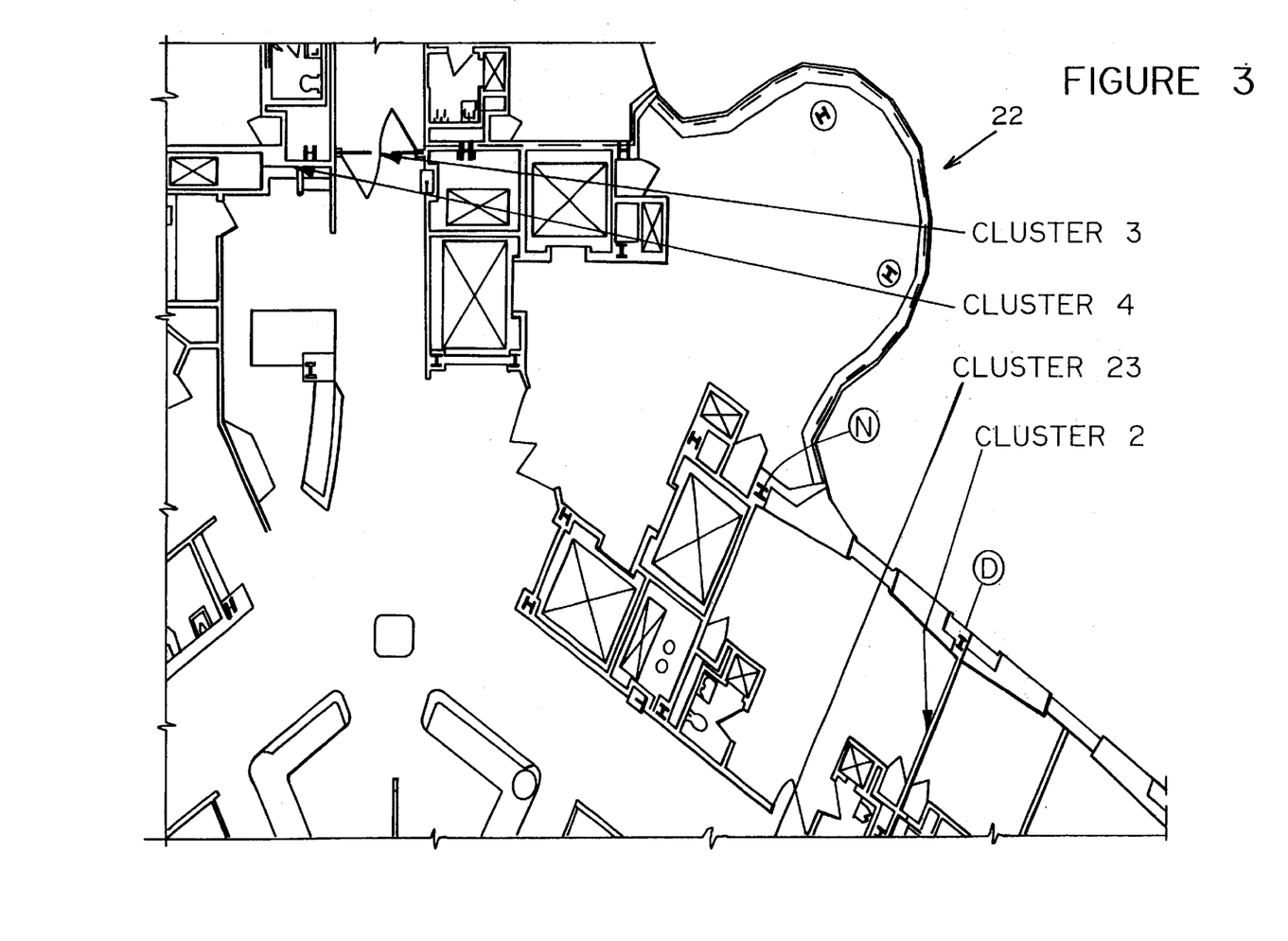
FIG. 3 shows an enlarged view of a portion of the floor plan shown in FIG. 2.

As shown in FIGS. 2 and 3, the portion 22 of the floor plan 20 includes cluster areas which may be selectable by the administrator in order to display information to the inspector demonstrating compliance with the standards enforced by the inspector. For example, when the administrator clicks on a specific cluster area, a message is transmitted over the network 18 to the central computer 16 requesting the downloading to the computer 12-1 of compliance information relating to the selected cluster area. A specific implementation of this example involves embedding in each cluster area a corresponding message to the central computer 16. This message not only contains the specific Internet URL of the central computer 16, but also a portion designating the building, floor, and cluster area for which compliance information is requested by the computer 12-1. An exemplary message is described below in connection with FIG. 13.

The portion 22 of the floor plan 20 that is enlarged in FIG. 3 includes four cluster areas which are designated CLUSTER 2, CLUSTER 3, CLUSTER 4, and CLUSTER 23. During the administrator's demonstration of compliance with the standards enforced by the inspector, the administrator, for example, may click on CLUSTER 4. When the administrator clicks on CLUSTER 4, the message corresponding to CLUSTER 4 is transmitted by the computer 12-1 to the central computer 16. This message requests the central computer 16 to transmit back to the computer 12-1 compliance information regarding CLUSTER 4.

Figure 4:
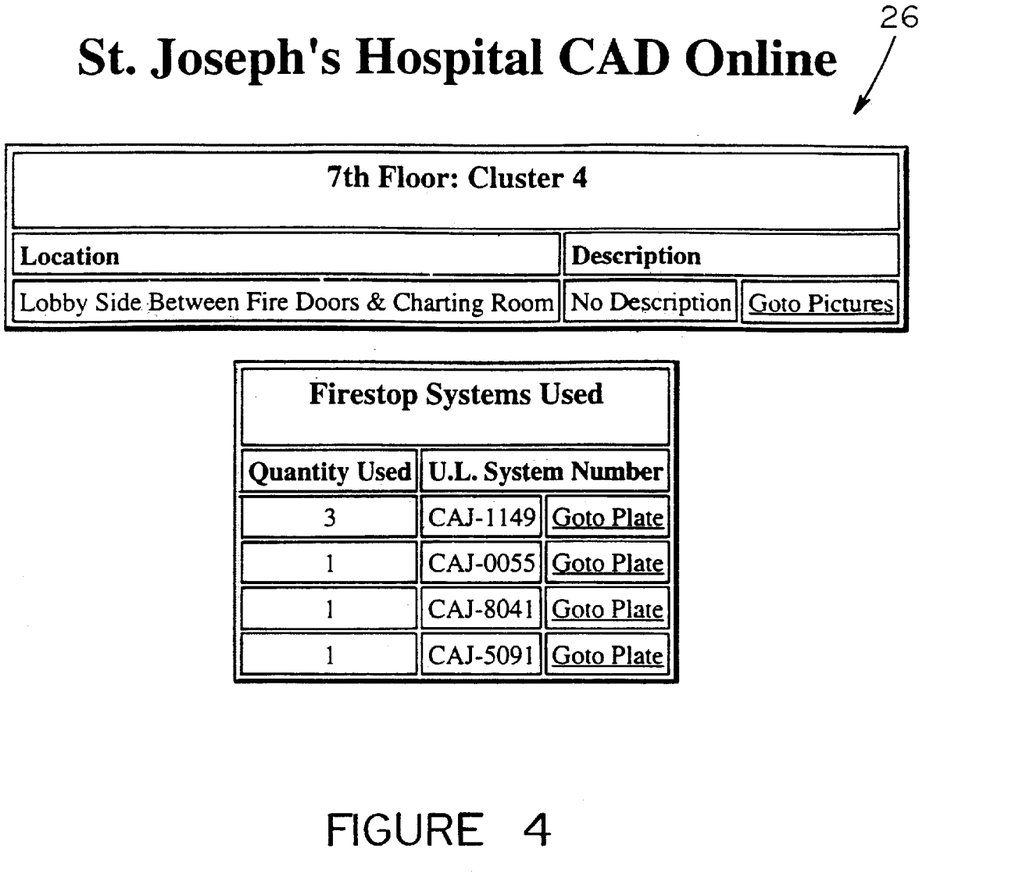
FIG. 4 shows a cluster description accessible from a selected cluster area of the floor plan shown in FIG. 2.

Accordingly, the central computer 16 transmits back to the computer 12-1 a cluster description 26 of CLUSTER 4. The cluster description 26 may take the form shown in FIG. 4 and includes information about CLUSTER 4. As shown in FIG. 4, the area of the building 14-1 covered by CLUSTER 4 may include several firestop systems and, hence, the use of the term "cluster" with regard to cluster areas. However, it should be noted, that the compliance information displayed to an inspector need not be clustered as described herein. Instead, a selected area of the floor plan 20 may relate only to one firestop system used at that location.

Figure 5:
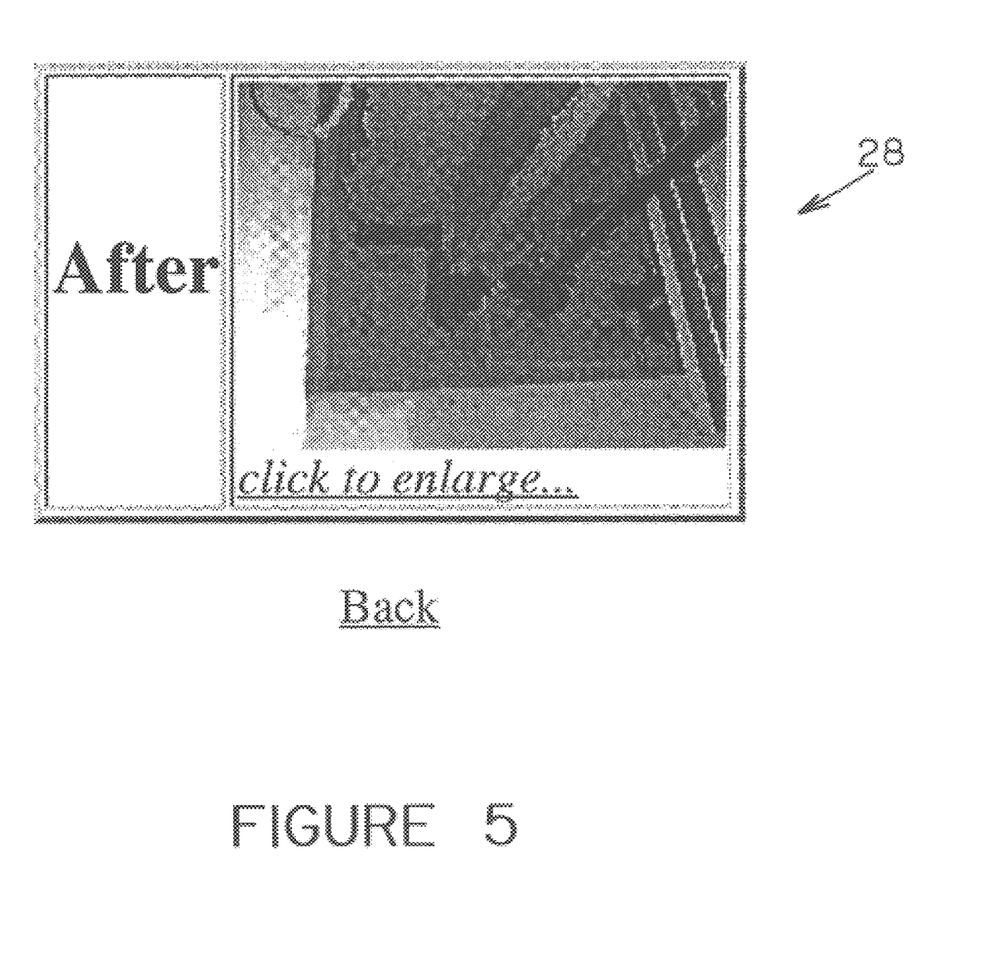
FIG. 5 shows an after illustration accessible from the cluster description of FIG. 4 and demonstrating compliance of a selected cluster area of the floor plan shown in FIG. 2 with a standard.

The cluster description 26 shown in FIG. 4 permits access to illustrations and plates containing information about compliance and standards relating to CLUSTER 4. Illustrations are referred to as pictures in FIG. 4, and plates, for example, may be U.L. plates showing applicable standards adopted by U.L. for various firestop systems. These illustrations and plates are accessible by Goto buttons as shown in FIG. 4, and are transmitted by the central computer 16 to the computer 12-1 along with the cluster description 26. Accordingly, if the administrator clicks on the Goto Pictures button in the cluster description 26 shown of FIG. 4, the computer 12-1 displays an After Illustration 28 shown in FIG. 5. As shown by FIG. 5, the After Illustration 28 may be enlarged. An enlarged view of the After Illustration 28 is shown in FIG. 6.

Figure 6:
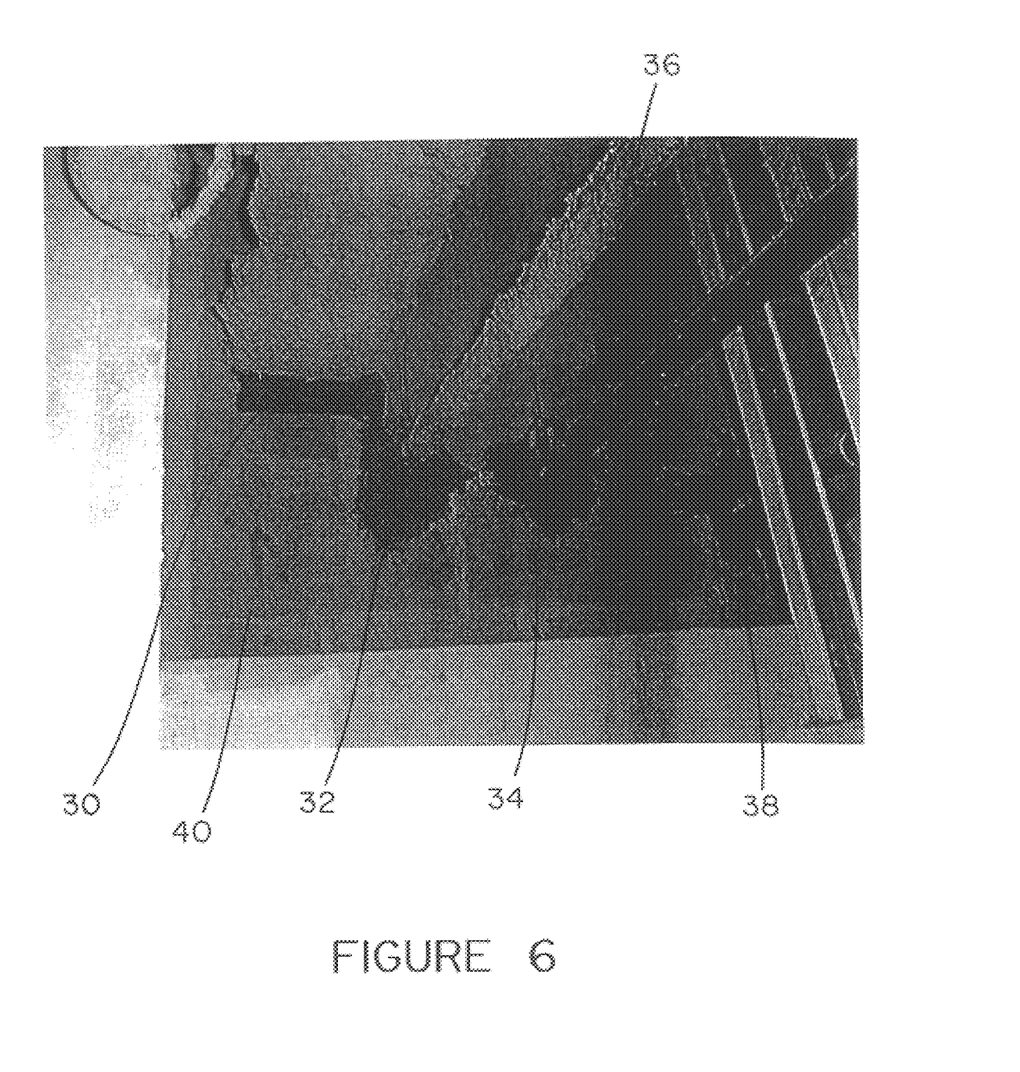
FIG. 6 shows an enlarged view of the after illustration of FIG. 5.

The After Illustration 28 shown in FIGS. 5 and 6 demonstrates that proper firestop systems have been provided for CLUSTER 4. Certain of these firestop systems are designated 30, 32, 34, 36, and 38 in FIG. 6. These firestop systems involve the use of approved materials to seal holes in a cement block wall 40 of CLUSTER 4 in order to prevent fire and smoke on one side of the cement block wall 40 from penetrating to the other side of the cement block wall 40. These particular firestops are in compliance with the approved standards as embodied by the plates which are also accessible from the cluster description 26.

Figure 7:
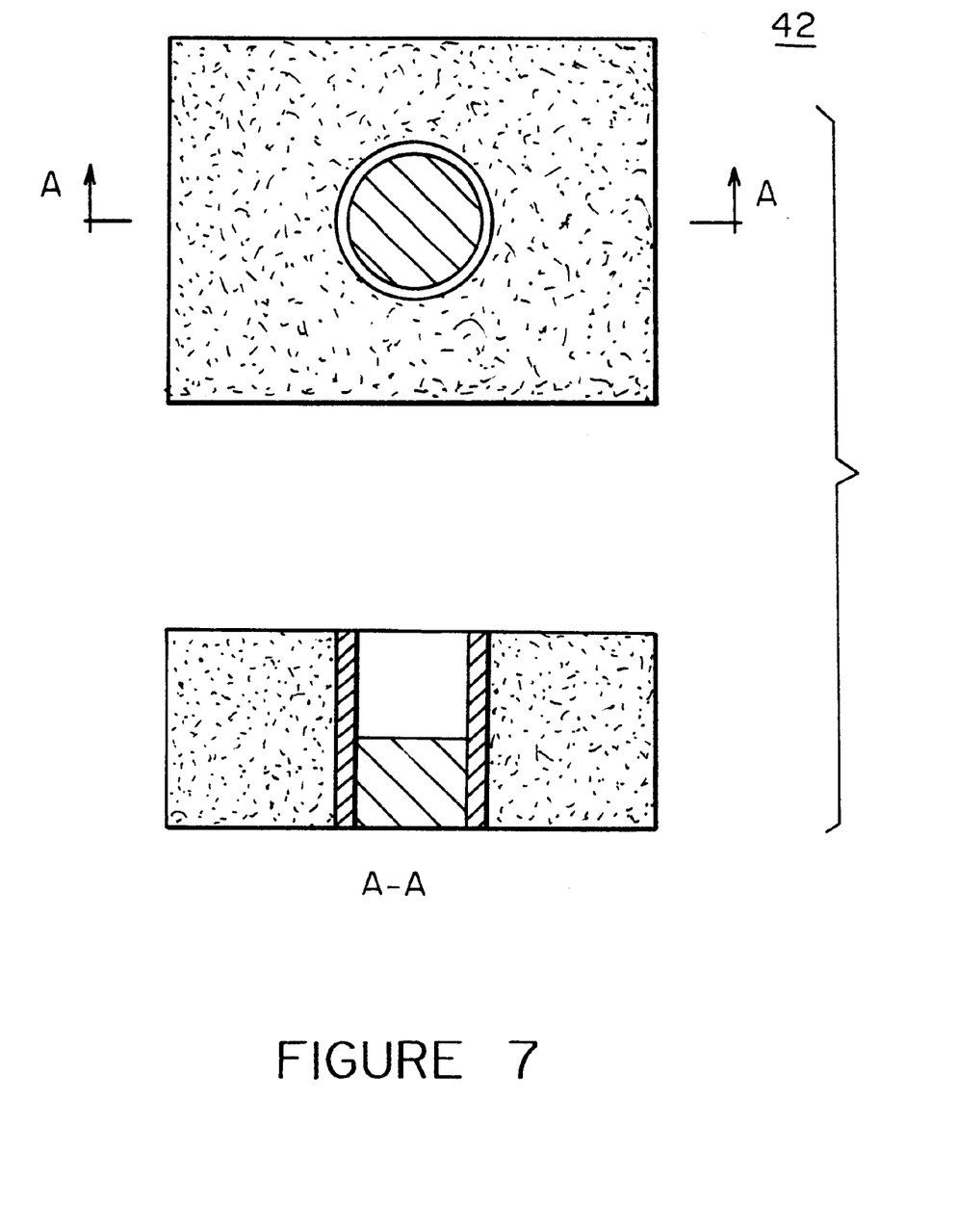
FIG. 7 shows a plate which is accessible from the cluster description of FIG. 4 and which embodies a portion of a standard governing one part of a cluster area of FIG. 2.

The plates pertinent to the firestop systems covered by the cluster description 26 of FIG. 4 and shown by the After Illustration of FIGS. 5 and 6 are accessible by Goto Plate buttons. Selection of the second Goto Plate button of the cluster description 26 shown in FIG. 4, for example, causes a plate 42 shown in FIG. 7 to be displayed to the administrator and inspector. The plate 42 specifies the proper firestop for a blank opening in a concrete floor, wall, or block wall and may be pertinent to the firestop system 36 shown in the enlarged view of FIG. 6.

Figure 8:
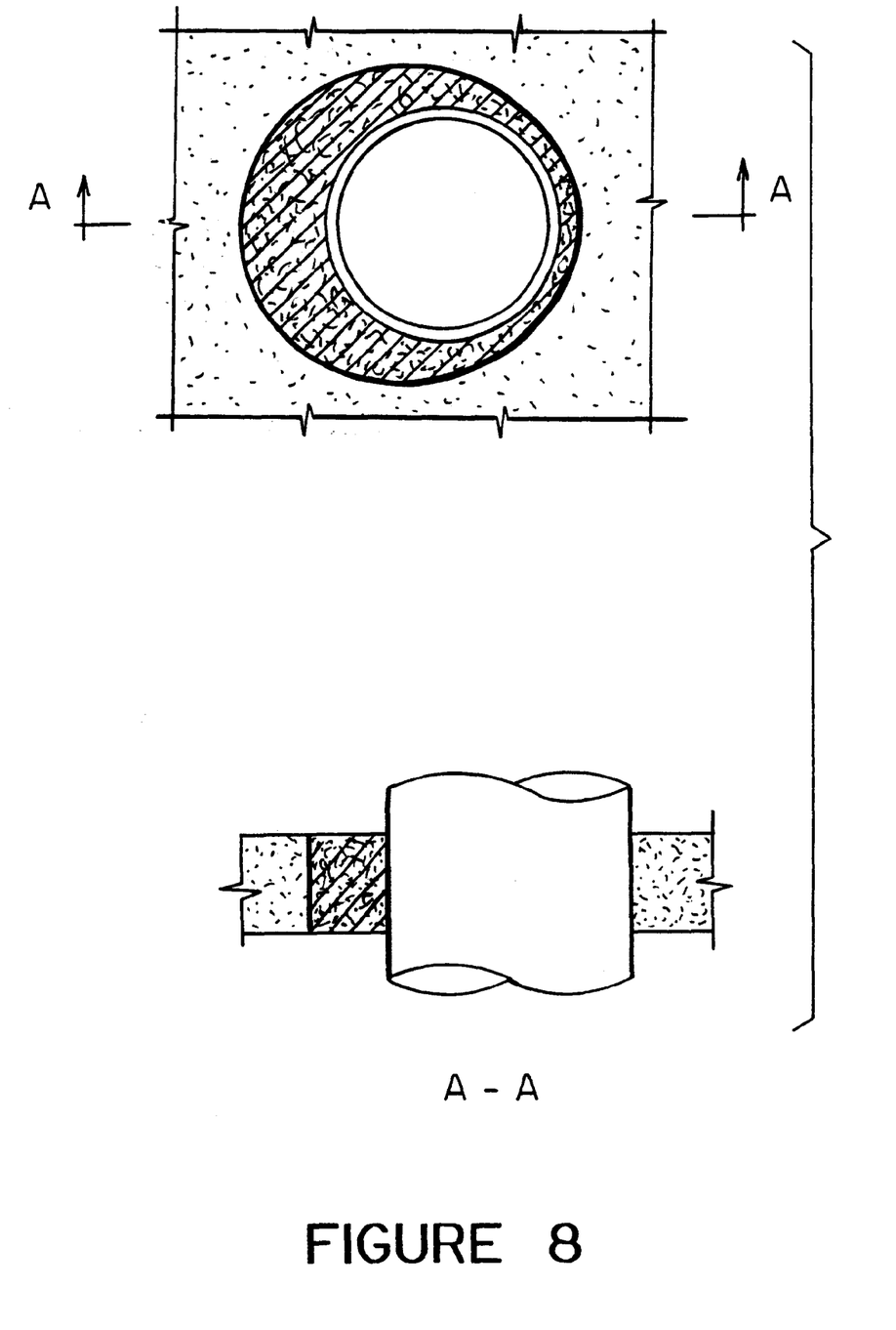
FIG. 8 shows another plate which is accessible from the cluster description of FIG. 4 and which embodies another portion of a standard governing another part of a cluster area of FIG. 2.

On the other hand, if the administrator clicks on the first Goto Plate button of the cluster description 26 shown in FIG. 4, a plate 44 shown in FIG. 8 is displayed to the administrator and inspector. The plate 44 specifies the proper firestop for a metal pipe which extends through a concrete floor, wall, or block wall and may be pertinent to the firestop systems 32, 34, and 38 shown in the enlarged view of FIG. 6.

Figure 9:
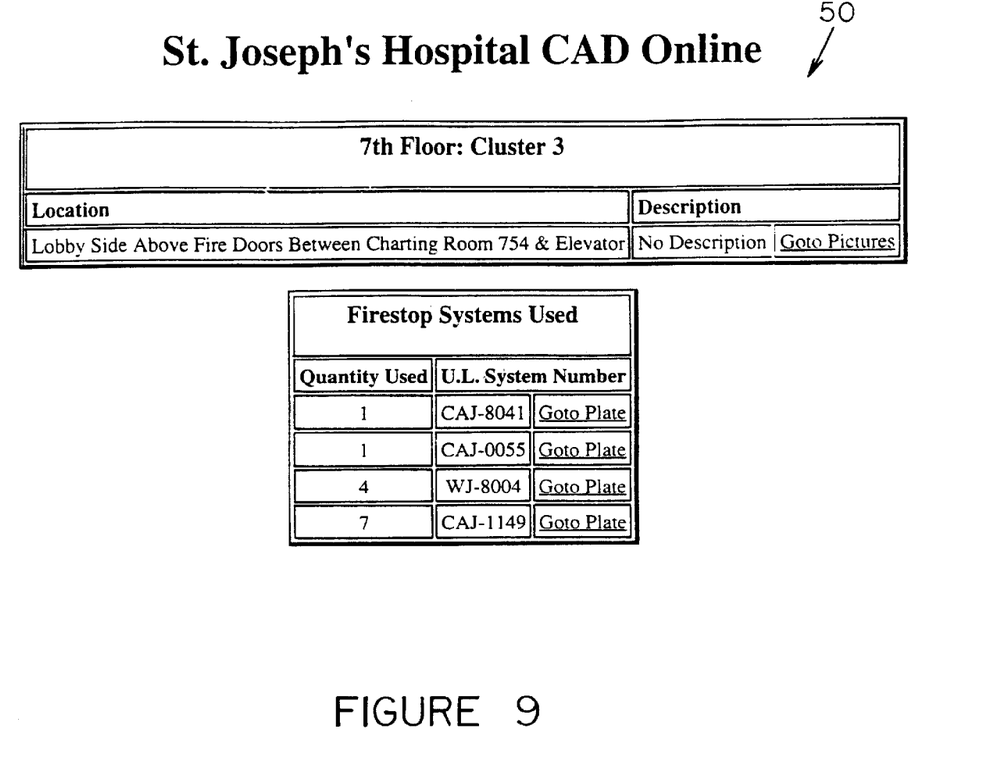
FIG. 9 shows another cluster description accessible from another selected cluster area of the floor plan shown in FIG. 2.

When the administrator clicks on CLUSTER 3, a message is likewise transmitted by the computer 12-1 to the central computer 16 over the network 18. This message requests the central computer 16 to transmit back to the computer 12-1 information about compliance and standards regarding CLUSTER 3. Accordingly, the central computer 16 transmits back to the computer 12-1 a cluster description 50 of CLUSTER 3. The cluster description 50 may take the form shown in FIG. 9 and includes information about CLUSTER 3. As shown in FIG. 9, the area of the building 14-1 covered by CLUSTER 3 includes several firestop systems. As can be seen, the cluster description 50 shown in FIG. 9 is similar to the cluster description 26 shown in FIG. 4. However, as would be expected, the location description and firestop systems of CLUSTER 3 are different from the location description and firestop systems of CLUSTER 4.

Figure 10:
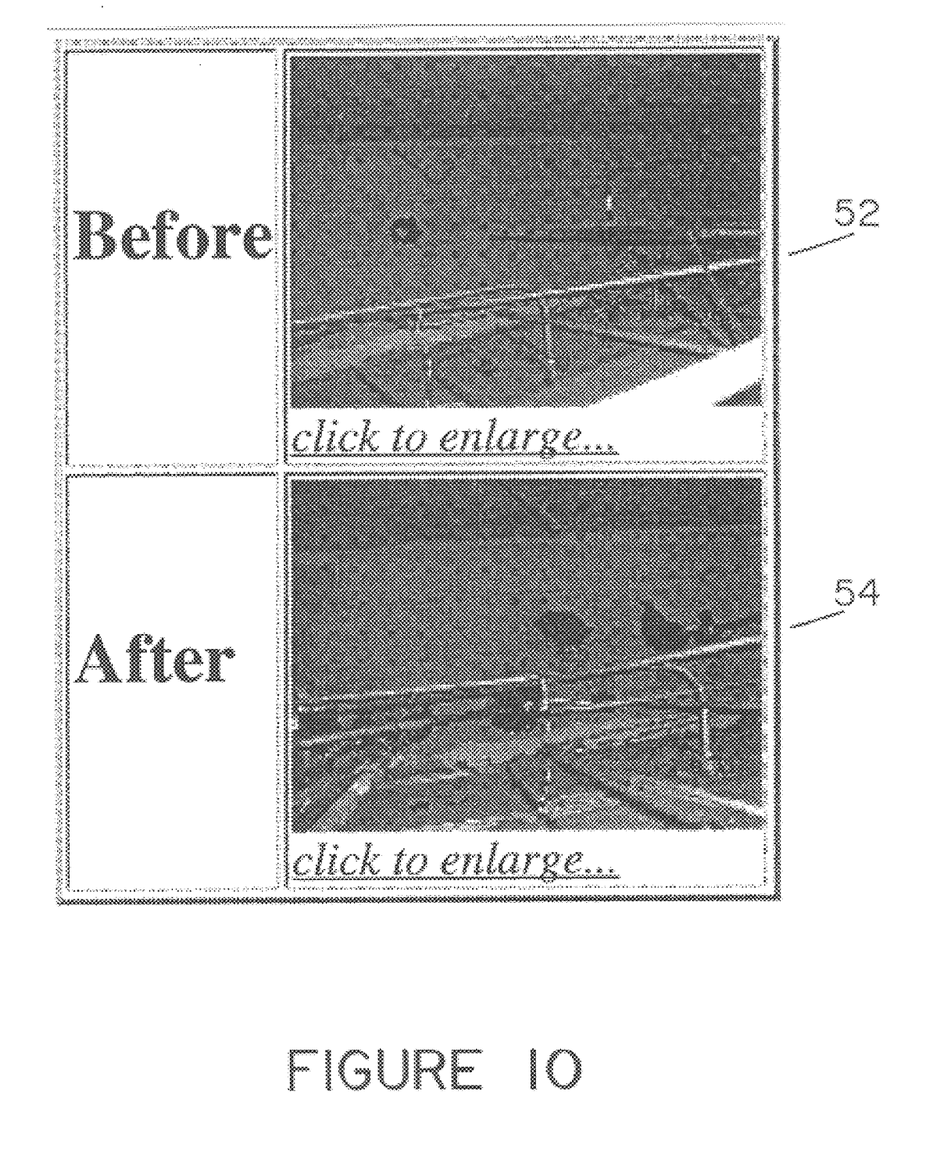
FIG. 10 shows before and after illustrations accessible from the cluster description of FIG. 9 and demonstrating compliance with a standard of a selected cluster area of the floor plan shown in FIG. 2.
Figure 11:
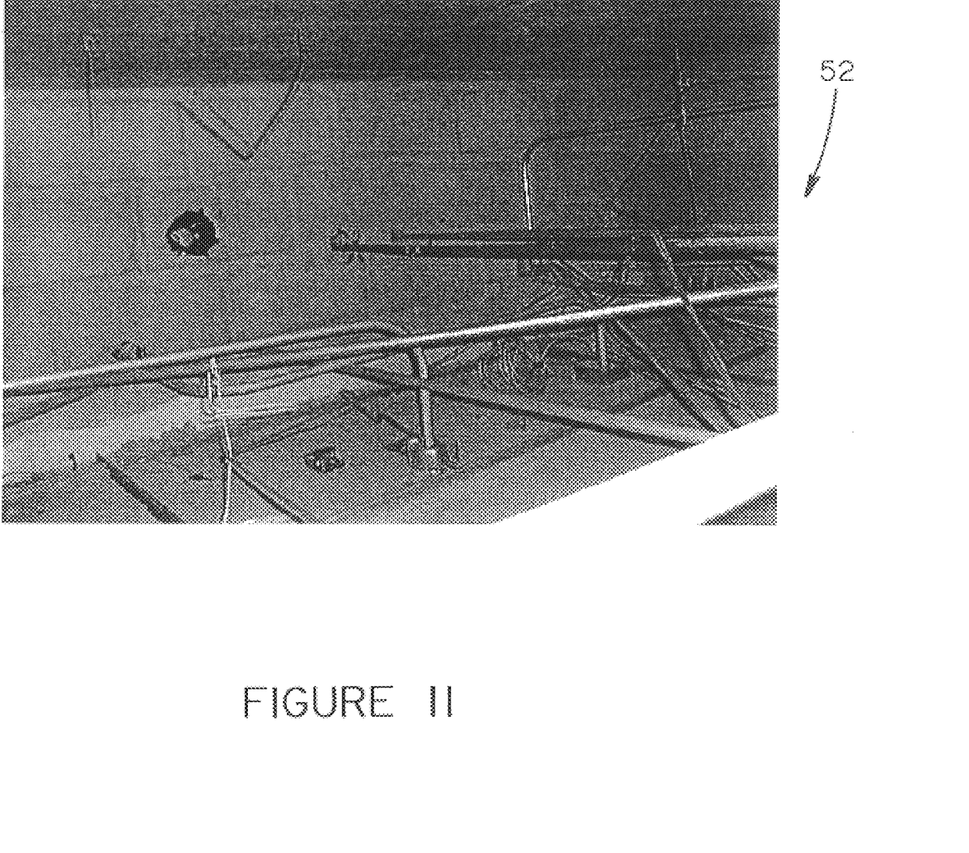
FIG. 11 shows an enlarged view of the before illustration of FIG. 10.
Figure 12:
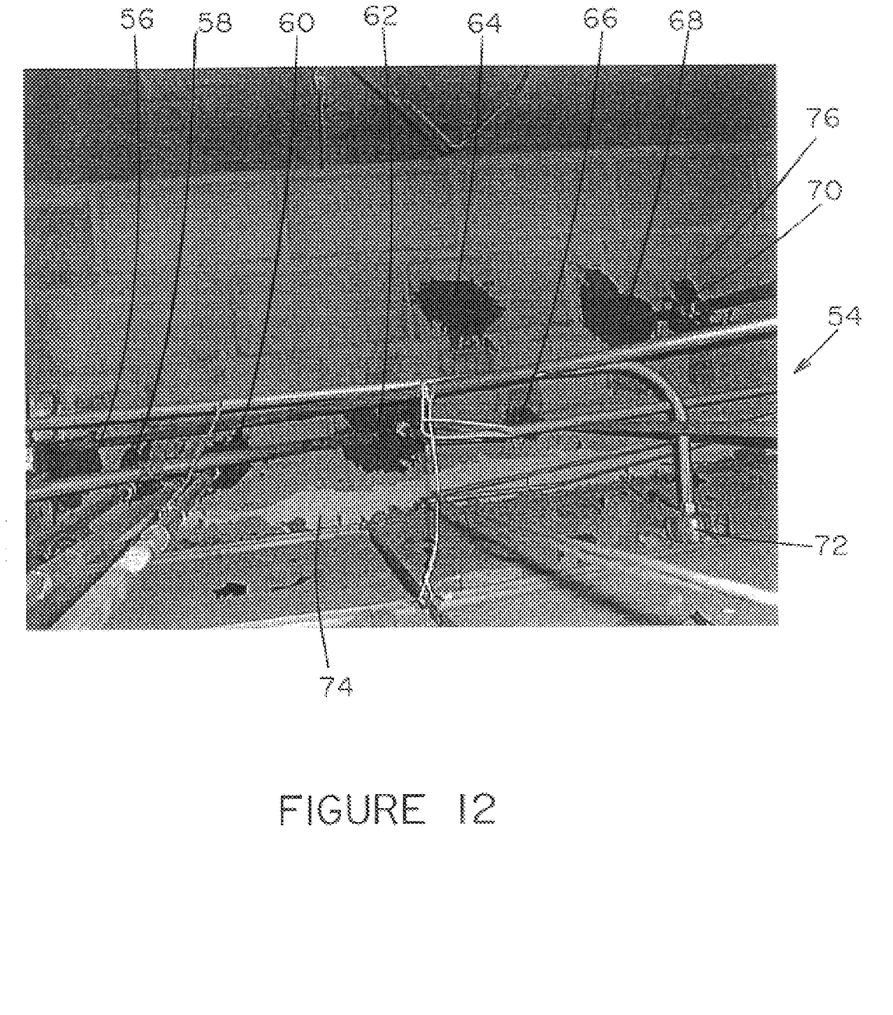
FIG. 12 shows an enlarged view of the after illustration of FIG. 10.

The cluster description 50 shown in FIG. 9 permits access to illustrations and plates containing information about compliance and standards relating to CLUSTER 3. These illustrations and plates are accessible by Goto buttons as shown in FIG. 9, and are transmitted by the central computer 16 to the computer 12-1 along with the cluster description 50. Accordingly, if the administrator clicks on the Goto Pictures button in the cluster description 50 shown of FIG. 9, the computer 14-1 displays a Before Illustration 52 and an After Illustration 54 shown in FIG. 10. As shown by FIG. 10, the Before Illustration 52 and the After Illustration 54 may be enlarged. An enlarged view of the Before Illustration 52 is shown in FIG. 11, and an enlarged view of the After Illustration 54 is shown in FIG. 12.

The Before Illustration 52 demonstrates the state of CLUSTER 3 before firestop systems are put into place. The After Illustration 54 shows the state of CLUSTER 3 after firestop systems are put into place. As in the case of FIGS. 4–8, the After Illustration 54 shown in FIGS. 10 and 12 demonstrates that certain firestop systems, such as firestop systems 56, 58, 60, 62, 64, 66, 68, 70, 72, and 74, have been provided for the portion of the floor plan 20 covered by CLUSTER 3. These firestop systems involve the use of approved materials to seal holes in a cement block wall 76 of CLUSTER 3 in order to prevent fire and smoke on one side of the cement block wall 76 from penetrating to the other side of the cement block wall 76. These particular firestops are in compliance with the approved standards as embodied by the plates which are also accessible from the cluster description 50.

The plates pertinent to the firestop systems covered by the cluster description 26 of FIG. 4 and shown by the After Illustration of FIGS. 5 and 6 are accessible by Goto Plate buttons. These plates are not shown in the drawings but they are specified in the cluster description 50, and they are similar to the plates 42 and 44 shown in FIGS. 7 and 8.

Figure 13:
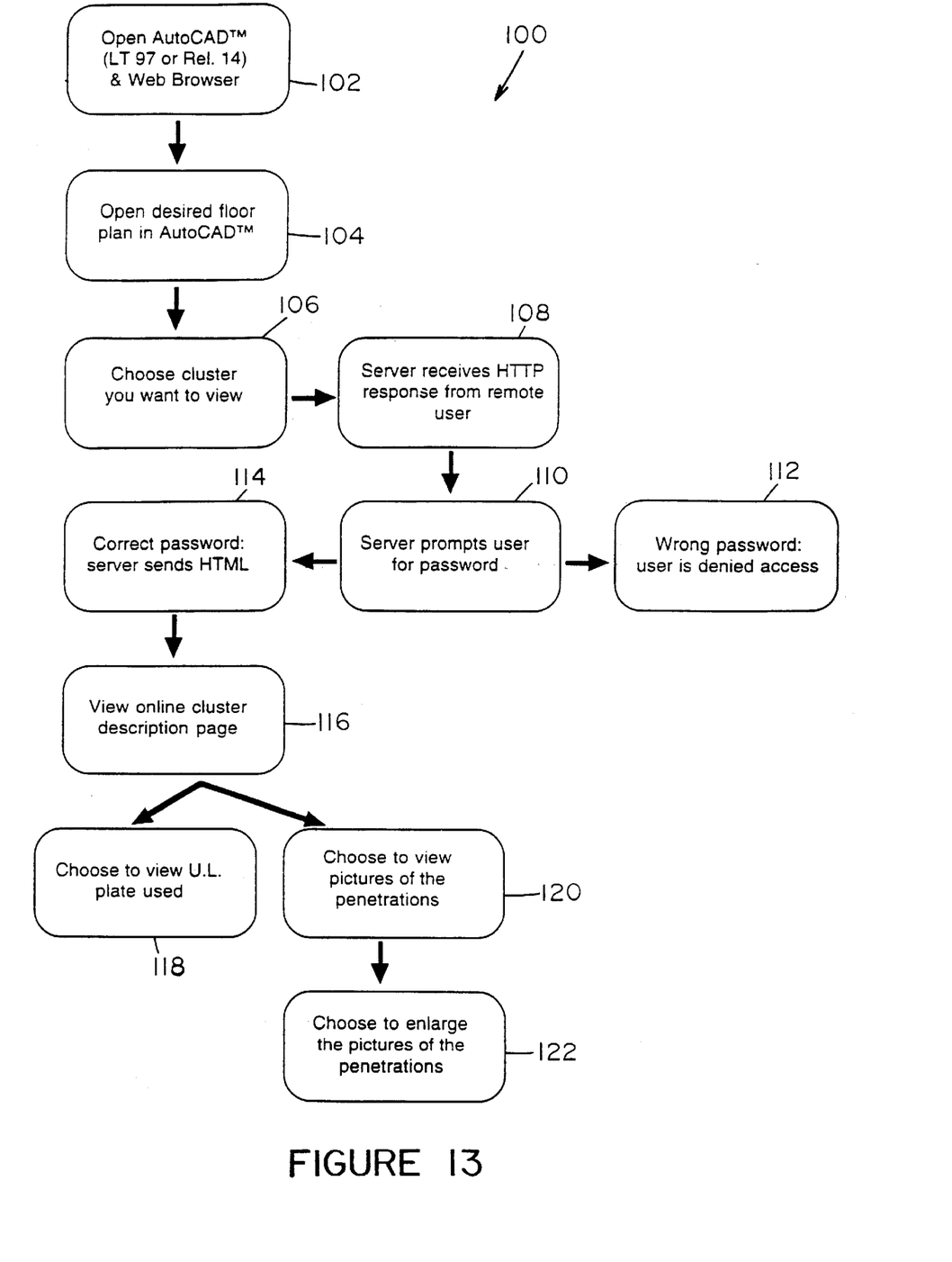
FIG. 13 shows a flow chart of a compliance demonstration program which may be executed by the computer system of FIG. 1 in carrying out the present invention.

FIG. 13 shows a flow chart of a compliance demonstration program 100 which may be executed by the computer system 10 shown in FIG. 1 in order to carry out the principles of the present invention. Accordingly, when an administrator using the computer 12-1, for example, chooses to begin a compliance demonstration, the administrator at a block 102 opens up both the compliance demonstration program 100 and a web browser which will be used by the compliance demonstration program 100 in order to request information from the central computer 16 regarding compliance at selected cluster areas of a selected floor plan. When the compliance demonstration program 100 is opened at the block 102, the administrator is directed to select a floor plan from the building 14-1. When the administrator selects a floor plan at a block 104, the compliance demonstration program 100 displays that floor plan to the administrator and inspector. When the administrator at a block 106 selects a cluster area of the floor plan opened at the block 104, an HTTP address associated with the selected cluster area is transmitted to the central computer 16. For example, if CLUSTER 4 of the seventh floor plan is selected by the administrator, the HTTP address may be as follows:

http://www.btusaver.com/bldgname/7th/system4/ where btusaver.com is the address of the central computer 16, where bldgname is the designation of the building pertinent to the request for information, where 7th is the designation of the floor designated in the request, and where system4 designates the cluster area that is selected by the administrator. Accordingly, the central computer 16 receives the HTTP message from the computer 12-1 at a block 108 and, at a block 110, prompts the administrator for the administrator's password. If the password entered by the administrator and transmitted by the computer 14-1 to the central computer 16 is wrong, the administrator at a block 112 is denied access to the information stored at the central computer 16, and the compliance demonstration program 100 returns to the block 102.

However, if the password entered by the administrator and transmitted by the computer 14-1 to the central computer 16 is correct, the central computer 16 at a block 114 transmits an HTML page to the computer 12-1 containing (i) a cluster description pertinent to the cluster and floor selected by the administrator, (ii) Before and/or After Illustrations pertinent to the cluster and floor selected by the administrator, and (iii) plates relating to the standards pertinent to the selected cluster and floor.

The cluster description of the selected floor and cluster is displayed to the administrator at a block 116. As described above, the administrator may view illustrations and/or plates from the displayed cluster description. For example, if the administrator selects a Goto Picture button from the displayed cluster description, a Before and/or After Illustration of the selected cluster is displayed. As another example, if the administrator selects a Goto Plate button from the displayed cluster description, a plate appropriate to one of the firestop systems covered by the cluster description is displayed.

Accordingly, if the administrator selects a Goto Plate button from the cluster description displayed at the block 116, a plate appropriate to the selected Goto Plate button is displayed to the administrator at a block 118. On the other hand, if the administrator chooses a Goto Picture button from the cluster description displayed at the block 116, a Before and/or After Illustration for the cluster is displayed to the administrator at a block 120. The administrator may choose to enlarge the chosen Before and/or After Illustration at a block 122.

In this manner, the administrator may go cluster by cluster and floor by floor through the building being inspected in order to demonstrate to the inspector compliance with the applicable standards.

If desired, the cluster descriptions pertinent to the selected floor plan 20 may be displayed along with the floor plan 20 in a cluster description area 200 of FIG. 2. Similarly, the plates pertinent to the selected floor plan may be displayed along with the floor plan 20 in a plate area 300 of FIG. 2. Although the detail of the cluster description area 200 and the plate area 300 are difficult to read with respect to FIG. 2, any cluster description in the cluster description area 200 and/or any plate in the plate area 300 may be enlarged in order to more adequately display the information contained therein. Such enlargements are shown in FIGS. 4, 7, 8, and 9 by way of example.

Certain modifications of the present invention have been discussed above. Other modifications will occur to those practicing in the art of the present invention. For example, as described above, floor plans are displayed by a local computer located in a first building and are used to access information demonstrating compliance from a central computer located in a second building. However, the present invention need not require a central computer. Instead, both the floor plans and the information demonstrating compliance may be stored on the local computer located in a building to be inspected.

Also, as described above, Goto buttons are used to access illustrations and plates that are previously downloaded by the central computer 16 to the computers 12-1 through 12-N along with cluster descriptions. However, these Goto buttons instead may be communication links back to the computer 12-1. Accordingly, when a Goto button is activated, a message may be sent to the central computer 16 requesting that the central computer 16 download to the local computer the information associated with the activated Goto button.

Moreover, Goto buttons are used to access certain information such as illustrations and plates. Instead, other types of Goto areas may be displayed to the user in order to permit such access. Alternatively, keystrokes may be used to access this information instead of clicking on Goto areas of the display.

Furthermore, the cluster description area 200 and the plate area 300 are displayed along with the floor plan 20. However, the cluster description area 200 and the plate area 300 need not be displayed with the floor plan 20.

Additionally, as discussed above, standards as used herein may be any industry standards, local codes, federal regulations, state regulations, local regulations, and/or the like, by which compliance may be judged. These standards may regulate, for example, protection against the hazards of fire, smoke, asbestos, and/or the like.

As described above, the network 18 may be implemented by a Public Telephone System, the Internet, or the like. Instead, fiber optic cables, over-the-air transmissions, or the like may be used to implement the network 18.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method executed on a computer comprising the following steps:
   a) displaying a floor plan selected by a user, wherein the displayed floor plan is regulated by a standard; and,
   b) displaying information demonstrating that the floor plan is in compliance with the standard, wherein the displayed information includes before and after illustrations, wherein the before illustration illustrates at least a portion of the floor plan before compliance with the standard, and wherein the after illustration illustrates at least the portion of the floor plan after compliance with the standard.

2. The method of claim 1 wherein the displayed information includes an illustration pertinent to the floor plan, and wherein the illustration illustrates compliance with the standard.

3. A method executed on a computer comprising the following steps:
   a) displaying a floor plan selected by a user, wherein the displayed floor plan includes designated areas, and wherein the designated areas are regulated by a standard; and,
   b) in response to selection by the user of one of the designated areas, displaying information demonstrating that the selected designated area is in compliance with the standard.

4. The method of claim 3 wherein the displayed information includes an illustration of the selected designated area, and wherein the illustration illustrates compliance with the standard.

5. The method of claim 3 wherein the displayed information includes before and after illustrations of the selected designated area, wherein the before illustration illustrates the selected designated area before compliance with the standard, and wherein the after illustration illustrates the selected designated area after compliance with the standard.

6. The method of claim 3 wherein the displayed information includes at least a portion of the standard relating to the selected designated area.

7. The method of claim 3 wherein the displayed information includes a description of the selected designated area, wherein the description includes first and second Goto areas, wherein the first Goto area permits the user to view at least a portion of the standard relating to the selected designated area, and wherein the second Goto area permits the user to view an illustration of the selected designated area.

8. The method of claim 7 wherein the illustration illustrates compliance with the standard.

9. The method of claim 7 wherein the illustration includes before and after illustrations of the selected designated area, wherein the before illustration illustrates the selected designated area before compliance with the standard, and wherein the after illustration illustrates the selected designated area after compliance with the standard.

10. The method of claim 3 wherein the displayed information includes a description of the selected designated area, wherein the description includes a Goto area, and wherein selection of the Goto area causes compliance information of the selected designated area to be displayed.

11. The method of claim 10 wherein the compliance information includes an illustration showing compliance of the selected designated area to be displayed.

12. The method of claim 10 wherein the compliance information includes before and after illustrations to be displayed, wherein the before illustration shows the selected designated area before compliance, and wherein the after illustration shows the selected designated area after compliance.

13. The method of claim 10 wherein the compliance information includes a portion of the standard pertinent to the selected designated area to be displayed.

14. The method of claim 3 wherein the standard relates to firestops.

15. The method of claim 3 wherein the standard relates to asbestos.

16. The method of claim 3 wherein a communication link is activated when the designated area is selected.

17. A method for demonstrating compliance with a standard comprising the following steps executed on a first computer:
   a) displaying a floor plan on the first computer, wherein the displayed floor plan is selected by a user, wherein the displayed floor plan includes designated areas, wherein each designated area includes a corresponding communication link, and wherein the designated areas are governed by a standard;
   b) transmitting a message to a second computer in response to selection of one of the designated areas by the user on the first computer, wherein the message is dependent upon the communication link corresponding to the selected designated area;
   c) receiving information from the second computer, wherein the information demonstrates that the selected designated area is in compliance with the standard; and,
   d) displaying the information on the first computer.

18. The method of claim 17 wherein the information displayed on the first computer includes an illustration of the selected designated area, and wherein the illustration illustrates compliance with the standard.

19. The method of claim 17 wherein the information displayed on the first computer includes before and after illustrations of the selected designated area, wherein the before illustration illustrates the selected designated area before compliance with the standard, and wherein the after illustration illustrates the selected designated area after compliance with the standard.

20. The method of claim 17 wherein the information displayed on the first computer includes at least a portion of the standard relating to the selected designated area.

21. The method of claim 17 wherein the information displayed on the first computer includes a description of the selected designated area, wherein the description includes first and second Goto areas, wherein the first Goto area permits the user to view at least a portion of the standard relating to the selected designated area, and wherein the second Goto area permits the user to view an illustration of the selected designated area.

22. The method of claim 21 wherein the illustration illustrates compliance with the standard.

23. The method of claim 21 wherein the illustration includes before and after illustrations of the selected designated area, wherein the before illustration illustrates the selected designated area before compliance with the standard, and wherein the after illustration illustrates the selected designated area after compliance with the standard.

24. The method of claim 17 wherein the information displayed on the first computer includes a description of the selected designated area, wherein the description includes a Goto area, and wherein selection of the Goto area causes compliance information of the selected designated area to be displayed.

25. The method of claim 24 wherein the compliance information includes an illustration showing compliance of the selected designated area to be displayed.

26. The method of claim 24 wherein the compliance information includes before and after illustrations to be displayed, wherein the before illustration shows the selected designated area before compliance, and wherein the after illustration shows the selected designated area after compliance.

27. The method of claim 24 wherein the compliance information includes a portion of the standard pertinent to the selected designated area to be displayed.

28. The method of claim 27 wherein the communication links include Internet addresses to the second computer.

29. The method of claim 17 wherein the first computer is located within a first building governed by the standard, and wherein the second computer is located within a second building.

30. The method of claim 17 wherein the standard relates to firestops.

31. The method of claim 17 wherein the standard relates to asbestos.

32. A method executed on a computer comprising the following steps:
   a) displaying a floor plan selected by a user, wherein the displayed floor plan is regulated by a standard; and,
   b) displaying information demonstrating that the floor plan is in compliance with the standard, wherein the displayed information includes at least a portion of the standard.

33. A method executed on a computer comprising the following steps:
   a) displaying a floor plan selected by a user, wherein the displayed floor plan is regulated by a standard; and,
   b) displaying information demonstrating that the floor plan is in compliance with the standard, wherein the displayed information includes a description pertinent to at least a portion of the floor plan, wherein the description includes a Goto area, and wherein selection of the Goto area causes compliance information of at least the portion of the floor plan to be displayed.

34. The method of claim 33 wherein the compliance information includes an illustration showing compliance of at least the portion of the floor plan to be displayed.

35. The method of claim 33 wherein the compliance information includes before and after illustrations to be displayed, wherein the before illustration shows at least the portion of the floor plan before compliance, and wherein the after illustration shows at least the portion of the floor plan after compliance.

36. The method of claim 33 wherein the compliance information includes a portion of the standard pertinent to the portion of the floor plan to be displayed.

37. A method executed on a computer comprising the following steps:
   a) displaying a floor plan selected by a user, wherein the displayed floor plan is regulated by a standard; and,
   b) displaying information demonstrating that the floor plan is in compliance with the standard, wherein the displayed information includes a description of at least a portion of the floor plan, wherein the description includes first and second Goto areas, wherein the first Goto area permits the user to view at least a portion of the standard relating to at least the portion of the floor plan, and wherein the second Goto area permits the user to view an illustration of at least the portion of the floor plan.

38. The method of claim 37 wherein the illustration illustrates compliance with the standard.

39. The method of claim 37 wherein the illustration includes before and after illustrations of at least the portion of the floor plan, wherein the before illustration illustrates at least the portion of the floor plan before compliance with the standard, and wherein the after illustration illustrates at least the portion of the floor plan after compliance with the standard.

40. A method executed on a computer comprising the following steps:
   a) displaying a floor plan selected by a user, wherein the displayed floor plan is regulated by a standard, and wherein the standard relates to firestops; and,
   b) displaying information demonstrating that the floor plan is in compliance with the standard.

41. A method executed on a computer comprising the following steps:
   a) displaying a floor plan selected by a user, wherein the displayed floor plan is regulated by a standard, and wherein the standard relates to asbestos; and,
   b) displaying information demonstrating that the floor plan is in compliance with the standard.

42. A method executed on a computer comprising the following steps:
   a) displaying a floor plan selected by a user, wherein the displayed floor plan is regulated by a standard, and wherein a communication link is embedded in the displayed floor plan; and,
   b) displaying information demonstrating that the floor plan is in compliance with the standard.

* * * * *

UNITED STATES PATENT AND TRADEMARK OFFICE
CERTIFICATE OF CORRECTION

PATENT NO.   : 6,283,759 B1  Page 1 of 1
DATED        : September 4, 2001
INVENTOR(S)  : Price et al.

It is certified that error appears in the above-identified patent and that said Letters Patent is hereby corrected as shown below:

<u>Column 9,</u>
Line 17, please delete "27" and insert in its place -- 17 --.

Signed and Sealed this

Eighteenth Day of March, 2003

JAMES E. ROGAN
*Director of the United States Patent and Trademark Office*